(12) United States Patent
Quick et al.

(10) Patent No.: US 10,806,172 B2
(45) Date of Patent: Oct. 20, 2020

(54) COMPACTION SYSTEM AND METHODS FOR MAKING FOOD BARS

(71) Applicants: Bruce Quick, Provo, UT (US); Cole Gunderson, Cypress, TX (US); John Salmon, Provo, UT (US); Cory Cozzens, Spanish Fork, UT (US); Taylor Schroedter, Katy, TX (US); Quinton Wong, Kent, WA (US); David Usevitch, El Paso, TX (US); Derek Croft, Provo, UT (US); Bryce Quick, Arlington, VA (US); Jason Dearden, Round Rock, TX (US); Ian Freeman, Layton, UT (US)

(72) Inventors: Bruce Quick, Provo, UT (US); Cole Gunderson, Cypress, TX (US); John Salmon, Provo, UT (US); Cory Cozzens, Spanish Fork, UT (US); Taylor Schroedter, Katy, TX (US); Quinton Wong, Kent, WA (US); David Usevitch, El Paso, TX (US); Derek Croft, Provo, UT (US); Bryce Quick, Arlington, VA (US); Jason Dearden, Round Rock, TX (US); Ian Freeman, Layton, UT (US)

( * ) Notice: Subject to any disclaimer, the term of this patent is extended or adjusted under 35 U.S.C. 154(b) by 239 days.

(21) Appl. No.: 16/113,048

(22) Filed: Aug. 27, 2018

(65) Prior Publication Data

US 2020/0060328 A1 Feb. 27, 2020

(51) Int. Cl.
*A23P 10/28* (2016.01)
*A23L 7/126* (2016.01)

(52) U.S. Cl.
CPC ............... *A23P 10/28* (2016.08); *A23L 7/126* (2016.08); *A23V 2002/00* (2013.01)

(58) Field of Classification Search
CPC ..... A23P 10/28; A23L 7/126; A23V 2002/00; A23K 40/20
See application file for complete search history.

(56) References Cited

U.S. PATENT DOCUMENTS

| 2013/0344221 A1 | 12/2013 | Farrell et al. |
| 2014/0023768 A1* | 1/2014 | Waldner .................. A23L 7/197 |
| | | 426/504 |
| 2016/0198757 A1* | 7/2016 | Park ........................ A23P 10/28 |
| | | 425/308 |

* cited by examiner

*Primary Examiner* — Nahida Sultana
(74) *Attorney, Agent, or Firm* — Amy Fiene; James Sonntag

(57) ABSTRACT

A system for making a food bar comprises a cup holder, a cutting station with a cutter that is configured to cut food contents within the cup holder, a pressing station with a press that is configured to compact the food contents within the cup holder, and a conveyor for moving the cutting station and the pressing station relative to the cup holder.

20 Claims, 24 Drawing Sheets

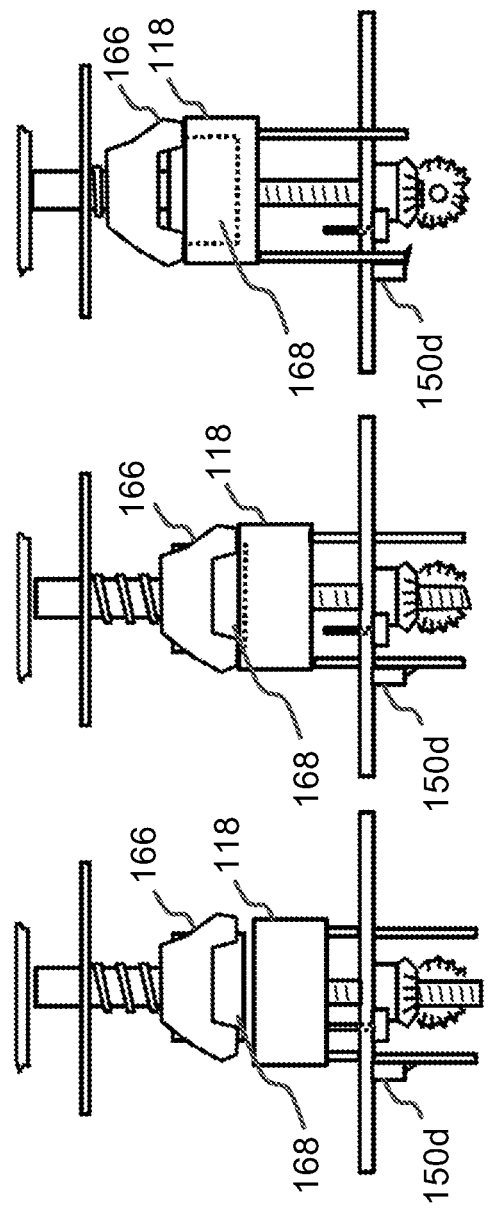

COMPACTION SYSTEM AND METHODS FOR MAKING FOOD BARS

BACKGROUND

Food bars offer a convenient manner in which to pack a lot of different ingredients into a single, stand-alone, edible form. Conventional food or snack bars on the market today are created at various large food production facilities, packaged in foil, and shipped throughout the United States and abroad for retail distribution. The bars vary in freshness, taste, ingredients, and nutrition.

Many food bars are designed to target specific purposes or geographic needs. Consider, for example, small villages with the inhabitants lacking nutrition, metropolitan workers riding subways with on-the-go meals, athletic training centers providing weight loss treatment, school children at recess needing energy snacks, and so on. Types of bars include, for example, nutrition bars, protein bars, fruit bars, dessert bars, and energy bars.

The mounting popularity of food bars is quickly giving rise to consumer demand for specialty food items of a higher quality and nutrition value.

SUMMARY

As used in this application "cup holder" includes any suitable cup-like container for containing a cup for containing food contents, or containing food contents directly.

By "cutting mode" it is meant that the cup holder is at a cutting station, and when the cup holder is in a relative position with a cutter to allow the cutter to cut food contents in the cup holder, it can be activated to cut the food contents in the cup holder. Generally, in the cutting mode, the cup holder is pressed against a cutting sleeve and held stationary while the cutter is moved to allow cutting blades on the cutter to move into and cut the food contents. The cutter and the cup holder may be stationary or movable to effect this movement.

By "pressing mode" it is meant that the cup holder is at a pressing station, and when it is in relative position with the press to allow the press to compress food contents in the cup holder, it can be activated to compress the food contents in the cup holder. The press and the cup holder may be stationary or movable to effect this movement. The press may be generally piston-like with the flat pressing surface or a pressing surface shaped to conform with the bottom of the cup holder.

The "conveyor assembly" includes a framework and components configured to change the alignment of the cup holder between an alignment operably at the cutting station and operably at the pressing station.

The "controller" includes electronics and a user interface for activating the conveyor, the cutting mode, and the pressing mode.

To make a single serving food bar, food materials are placed in the cup holder, which may be food contents already in a cup. When the system is activated, the controller in sequence (1) activates the cutting mode to cut the food contents, (2) activates the conveyor to change the relative alignment of the cupholder to be with the pressing station, and (3) activates the pressing mode to compress the food contents.

The food contents are chosen based upon the desired product, and includes innumerable recipes containing one or more of various nuts, grains, fruits, and the like.

The food bar may be a flat circular shape, but since the compressing essentially "molds" the bar, the press and the cup holder can be configured to mold the bar into any suitable shape, such as flat and non-circular, or curved with indentations (such as characters) in the surface.

BRIEF DESCRIPTION OF DRAWINGS

FIG. 14a is a parked position of the press station.
FIG. 14b is a contact position of the press station.
FIG. 14c is a press position of the press station.

DETAILED DESCRIPTION

Figure 1:
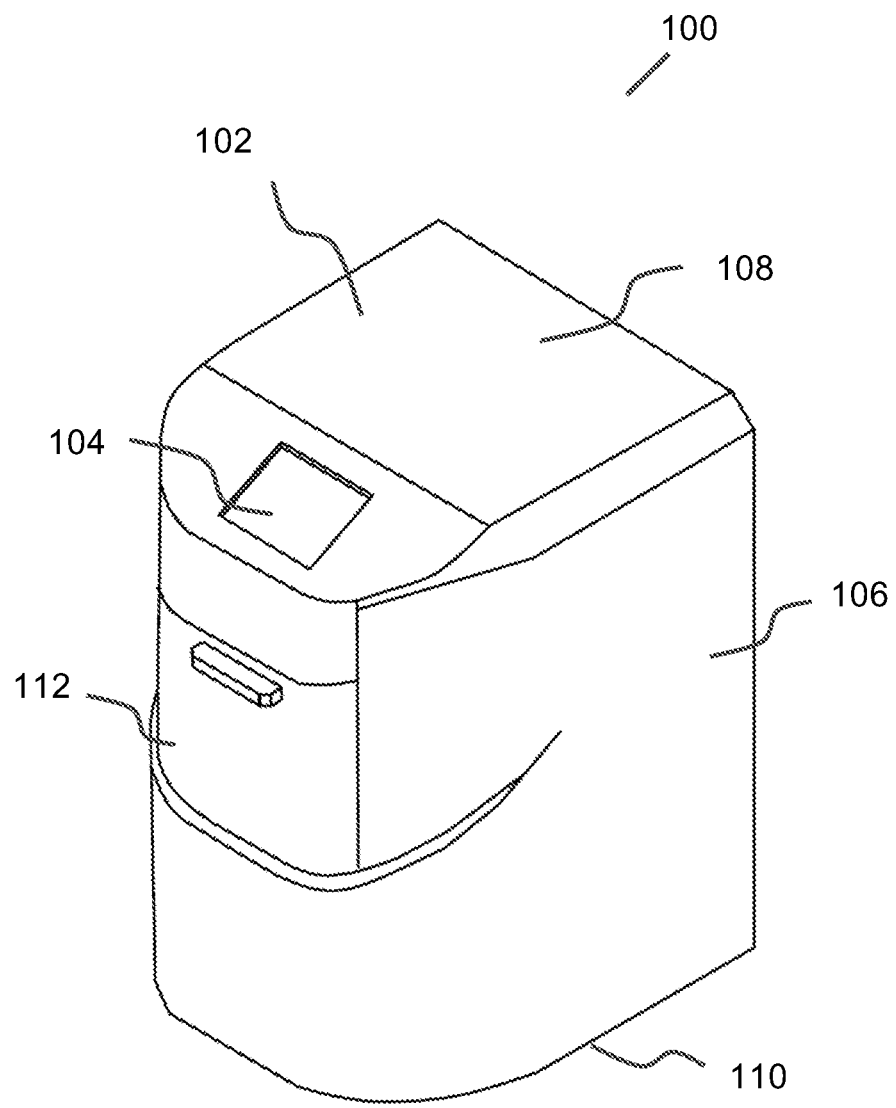
FIG. 1 is a perspective view of an exemplary device of the invention.

The following relates to systems, methods, and devices used for making a single serving food bar.

System Overview

By simply adding ingredients and pressing control buttons on a touch screen interface, the system appears to magically transform the ingredients into a single serving food bar, a ready-to-eat quick food bar. No mess, no fuss, the device works quickly, quietly, and efficiently. Furthermore, as a compact unit, the device can be easily stored on a countertop of a kitchen or located in a commercial assembly line.

The system can be used to make quick bars using any suitable edible material that is capable of being pressed together into a definite shape that maintains its structural stability up until the user eats it. The quick bars can have any suitable shape such as a circular shape, rectangular shape, square shape, or the like. The following system allows consumers to conveniently create at home or to obtain at a local retail food establishment, a quick bar (energy bar, granola bar, snack bar etc.) made of raw ingredients supplied by a provider that is fresh, high quality, and great tasting . . . and quick, in less than 60 seconds or even 30 seconds. The system enables end-users to simply input ingredients into a machine for the creation of a single serving 2 to 5 ounce bar.

The system engenders creativity in trying new ingredients and mixing and matching different ingredients. It also helps people with specific dietary needs, food allergies, cravings, or dislikes to create bars that they know they can eat or will like. A plethora of food items may be used with the device. This includes fresh market fruits and vegetables, along with select nuts and grains. Dietary supplements and medicines can also be easily incorporated, making them easier to digest. Besides being made at home, the food bars can be made-to-order at point of purchase commercial locations. Bars can be marketed as specialty bars, such as nutrition bars, protein bars, breakfast/lunch/dinner bars, candy bars, and snack bars. Using fresh ingredients, bars can have a fresher taste than typical commercial bars. They can taste better and be more nutritious.

The present system can tailor its food bar offerings to populations demanding natural and organic products where freshness and taste are paramount. The present system offers an extensive selection of raw ingredients (e.g., fruits, nuts, grains, etc.) and blends (e.g. protein powders, vitamin boosts, supplements, medicine, etc.) that are specifically designed for the lifestyles and geographic dietary needs and preferences of target populations within the United States and abroad. The present system may emphasize food product offerings that are the highest possible quality of fresh, natural, organic, and home-grown by U.S. farmers. Pre-packaged ingredients may also be used which enable the duplication of a bar. Packages may contain a pre-measured amount for making a certain number of single serving food bars. Essentially, the food bars produced by the system will not become stale by sitting in transport or on a retail store shelf. The system can include a proprietary line of machines and food blends that allow retail storefronts and residential customers to create single serving snack bars from raw ingredients in less than a minute.

The system will be illustrated by exemplary devices. Example 1 illustrates a system with a circular conveyor. Example 2 illustrates a system with a linear conveyor.

Example 1

Circular Conveyor

An exemplary circular device will now be illustrated with reference to FIGS. 1-14c.

In its simplest form, the device includes a housing and within the housing is contained a cup holder that alternates positions between a cutting station and a pressing station by means of a conveyor assembly that is controlled by a control unit. The conveyor assembly includes a rotating assembly that rotates the cutting station and the pressing station to change respective station alignment with the cup holder. The device further includes a vertical lift assembly that raises the cup holder to be operably connected to the cutting station and pressing station. Each station includes a slidable sleeve that is raised during operation to allow for respective acts of cutting and pressing of ingredients. The various rotational movements and acts are controlled by a control unit, the control unit comprising electronics that are separated from the mechanics located within the housing.

Turning to FIG. 1, an exemplary device 100 is shown having a housing 102 for holding internal components to provide an all-in-one compact unit. The exterior of the housing includes sidewalls 106, top wall 108, and bottom wall 110. An exemplary access portal allows access to an interior space in which a cup holder 118 and food contents are contained. The access portal may be rotating, pivotal, removable, slidable, or have other features. As shown, the exemplary access portal includes a slidable door 112 that slides downward to provide entry into the interior space. The device 100 further includes a touch screen interface control 104 on its exterior surface for making selections about the type of bar (e.g., fine grain, coarse grain, etc.) to be realized.

Figure 2:
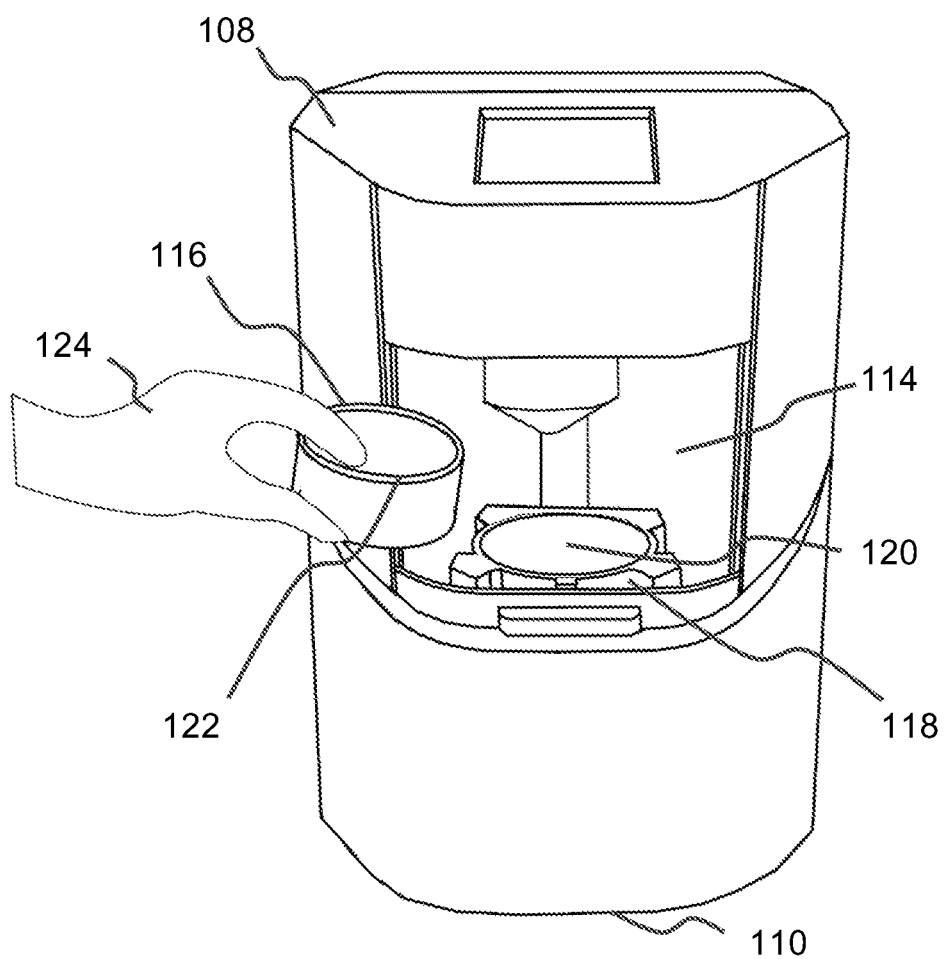
FIG. 2 is a front view of the device shown in FIG. 1, illustrating operation of the device.

Turning to FIG. 2, the device is shown with the slidable door 112 in an open position to reveal an interior space 114 and cup holder 118. The interior space 114 is configured to allow manual access by a standard human hand to place and retrieve items therein. For example, a removable cup 116 is shown being removed from the cup holder 116 by a human hand 124. Within the cup holder 116 is a finished single serving bar 122.

Figure 3:
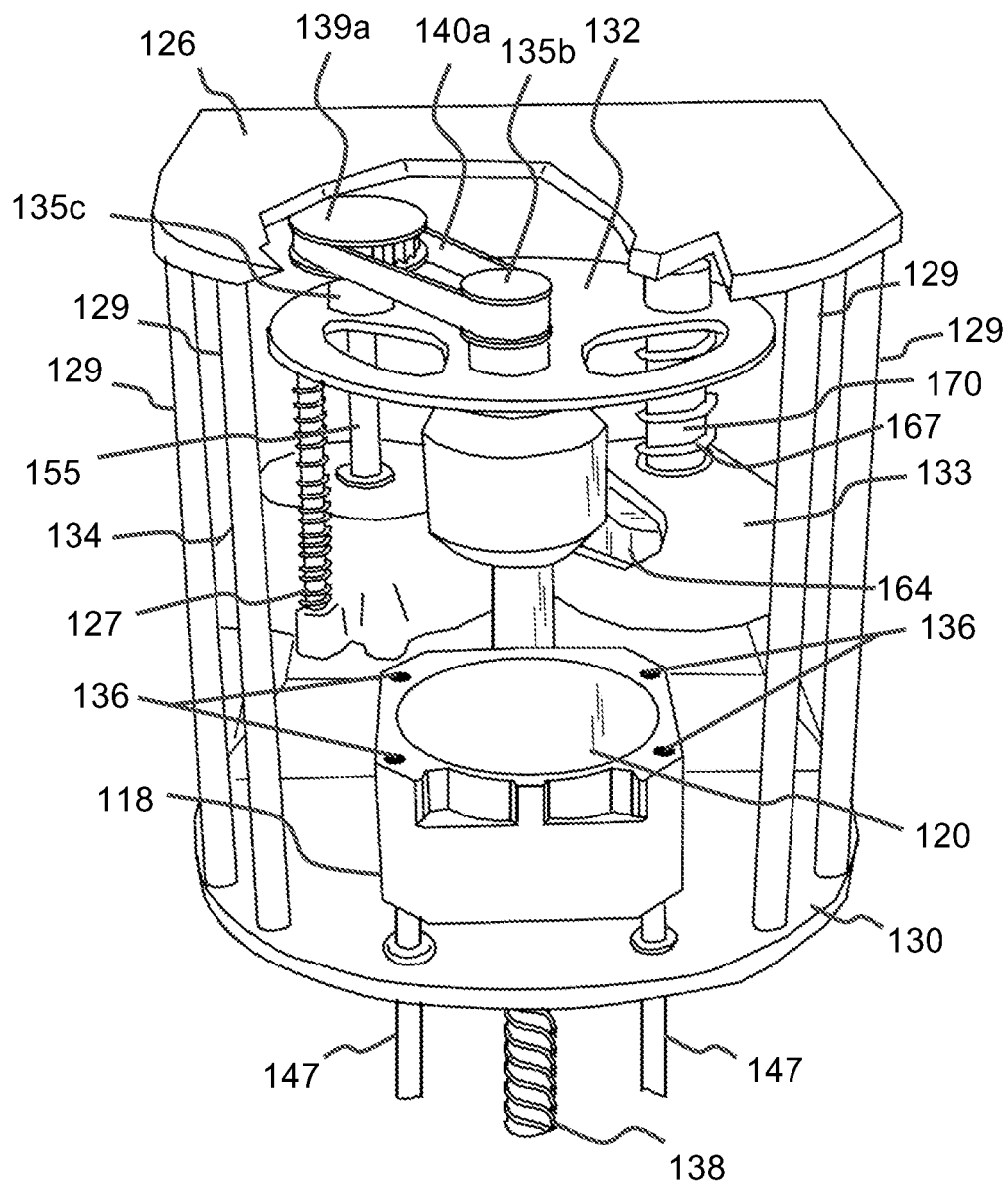
FIG. 3 is a front view of the device shown in FIG. 1 with the covers of the housing and part of the frame deleted to show internal structure.
Figure 4:
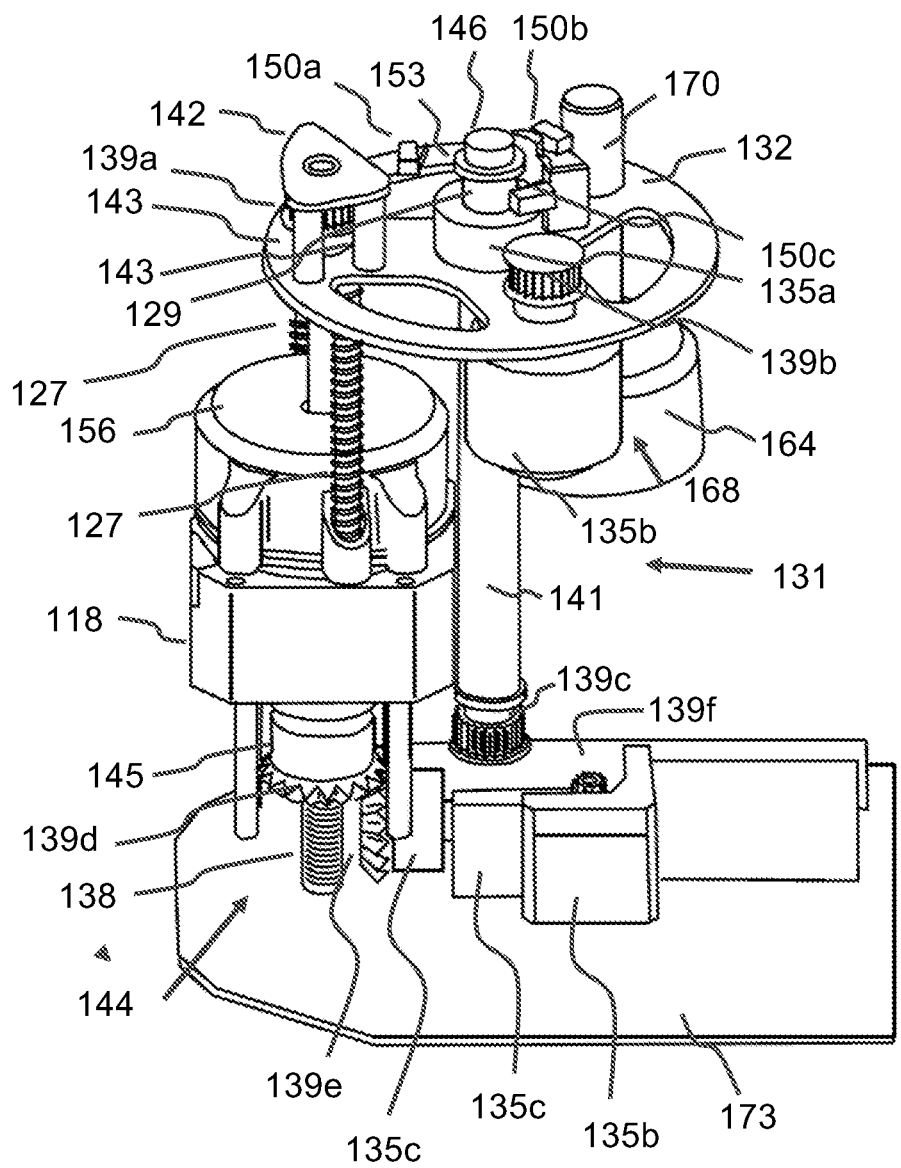
FIG. 4 is a side view as in FIG. 3, with the bottom plate 130 and other supporting structure removed to show the structure of the conveyor system and the vertical lift assembly.
Figure 5:
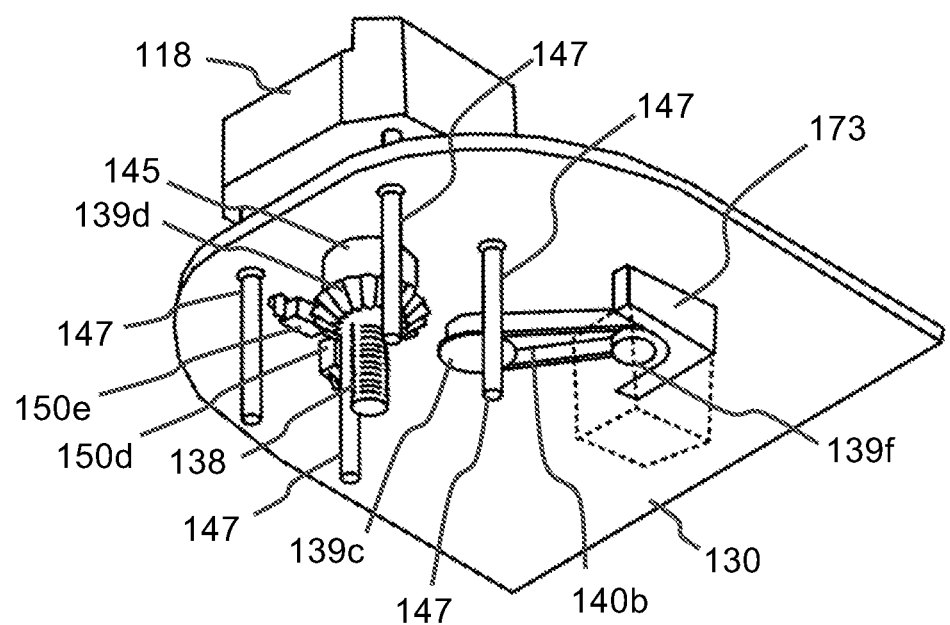
FIG. 5 is a bottom and side view as in FIG. 4 showing showing portions of the conveyor and vertical lift assembly that are below the bottom plate 130.
Figure 6:
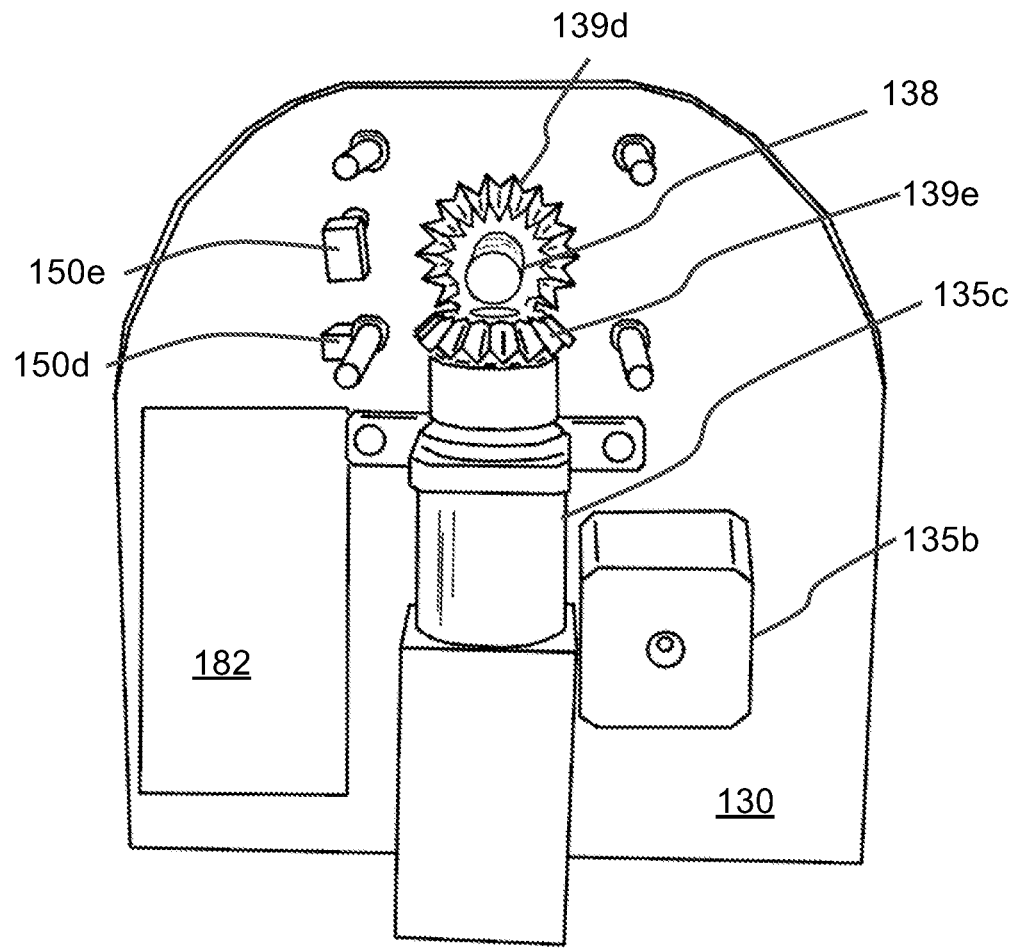
FIG. 6 is a bottom view as in FIG. 4 showing particularly structure below the bottom plate associated with the lift assembly.

Turning to FIGS. 3 and 4, the sidewalls and top wall are removed to reveal the cutting station 134, pressing station 133, and cup holder 118. Various components include a top plate 126, bottom plate 130, and intermediate members 129. The top plate 126 and bottom plate 130 include generally flat, rigid, or semi-rigid surfaces that are separated from each other by a plurality of intermediate members 129. The intermediate members 129 are elongate members connected at respective ends to the top plate 126 and bottom plate 130. The members 129 stand vertical with respect to the device with long axes in parallel alignment, the members being spaced apart from each other around toward outer edges of the two plates 126 and 130.

Within the space provided between the top plate 126 and bottom plate 130 is a rotating conveyor. The pressing station 133, cutting station 134, and a motor 135b are spaced equidistantly from each other around the rotating frame 132. The conveyor shown comprises a rotating frame 132 that moves a pressing station 133 and cutting station 134 into alignment with the cup holder 118 for the preparation of a food bar. At least one alignment element may be used to align the cup holder 118 with a station. For example, a plurality of magnets 136 are shown at opposite corners on the upward facing surface of the cup holder 118 in FIG. 3. The magnets are located so as to align with corresponding magnets on bottom facing corner surfaces of the cutting station and/or the press station (see FIGS. 10 and 11).

The conveyance of the cutting station 134 and pressing station 133 is powered by a motor 135a that is attached to the rotating frame 132. The rotating frame 128 of the conveyor assembly has a conveyor shaft 141 around which the rotating frame 132 rotates as described. The conveyor shaft 141 may comprise a supporting non-rotating inner shaft and an outer rotating sleeve 141 attached to a gear 139c. The outer sleeve 141 is attached to the rotating plate 132 to translate rotation of the gear 139c and sleeve to the rotating disc 132. The inner non-rotating shaft 146 extends up through the interior of the outer sleeve 141 and extends up through the rotating disc 132. Shown is inner non-rotating shaft 146 with a stepped end 153 to support the top plate.

A conveyor motor 135*b* is mounted on the underside of the bottom plate 130 by motor mount 173. The conveyor motor 135*b* drives a gear 139*f* or pulley, which in turn drives the gear 139*c* via a suitable belt 140*b* (See FIG. 5) or chain for the rotating frame 128. By this means, the conveyor motor 135*b* located below the bottom plate 130 rotates the outer sleeve 141 which translates to rotation of the rotating disc 132, along with the attached cutting station and pressing station. The central axis of the rotating frame is offset from a central axis of the cup holder 118. When the cutting station 134 is therefore rotated with the frame 132 rotating around its central longitudinal axis, the cutting station 134 circles around the frame 132 to be positioned directly above the cup holder 118 in axial alignment. The is also true for the pressing station 133, where rotational movement allows the pressing station 133 to be positioned directly above the cup holder in axial alignment.

The conveyor further includes a vertical lift 144 assembly for raising and lowering the cup holder 118. Once the cup holder 118 is aligned with either the cutting station 134 or the pressing station 133, the vertical lift assembly lifts the cup holder 118 to be operably engaged with respective station. As shown in FIG. 4, the exemplary vertical lift assembly 144 is essentially an axial lifter structure that is centrally located underneath the cup holder 118 and that applies a vertical force to underneath the cup holder. The lift assembly includes a threaded nut 145 located along an elongated threaded rod 149, the nut 145 being driven by a lift motor 135*c* and two bevel gears 139*c*, 139*d* for 90 degree gear transmission. The gears 139*c*, 139*d* and motor are separated from the cup holder 118 by the bottom plate 130 and are thereby protected from any moisture and food spillage.

In order to sense the limits of travel of the lift assembly, sensors, such as microswitches 150*d* and 150*e* are provided. Microswitch 150*d* may be switched as the bottom of one of the alignment guides 147 reaches the switch. Microswitch 150*e* may be switched by a rod extended up through the bottom plate that is depressed when by the cup holder reaching its lowest position.

A second motor 135*b* is attached to the rotating frame 132 and is configured to provide the cutting station 134 with power for cutting movements. The motor 135*b* is mechanically operational with the cutting station 134 through a belt 140*a* and gear-pulley 139*a* which are also located on the rotating frame 132.

A third motor 135*c* (FIG. 4) drives the vertical lift motion of the pressing station 133 to lift and lower the cup holder 118.

Vertical Lift

Once a station is aligned with the cup holder 118, the cup holder 118 is raised upward by a lead screw 138 that is centrally located underneath the cup holder 118. The lead screw 138 translates force to the cup holder 118 via motor 135*c* causing it to move upward. Guides 147 that run through the cup holder 118 ensure that the cup holder 118 remains level. The guides 147 are shown as elongate rods located on a corner of the cup holder 118. The guides 147 extend below the bottom plate 130. The guides 147 both support and guide the cup holder and provide steadiness and balance so that the opening of the cup faces axially upward relative to the frame whether the cup holder is stationed at rest on the bottom layer or moving vertically upward or downward.

Vertical motion is affected by dampening and structural stability implementation. For example, the cutting station includes two spring-loaded side connector guides 127 located on opposite ends of the cutting station. As the lift assembly 144 raises the cup holder 118, the two guides 127 provide a spring force resistance causing a tight fit between the station and the cup holder. This prevents food from spilling out during the processing of the food.

Similarly, the pressing station includes a press connector rod 170 with a press spring dampener 167, an annular coil that applies resistance when the cup holder is pushed upward or lowered against a neutral position.

After a station has completed its function, the threaded rod 138 translates force to the cup holder 118 causing the cup holder 118 to move downward and resume its original position.

The Cup Holder

Turning to FIG. 4, a side view of the interior space is shown. The cup holder 118 shown comprises a containment with a cylindrical hollow interior (see FIG. 3). The shape and dimensions of the interior are configured to hold food contents and withstand pressures and forces for making a food bar. The hollow interior of the cup holder 118 may be symmetrical with a cylindrical interior as shown. Alternatively, the interior of the cup holder 118 may have an assymmetrical geometry. Also, interiors may be optimized to make the cutting process more effective with food being evenly distributed, without clumping, and/or without air pockets.

The hollow interior may have any suitable shape that is configured to allow contents to be pressed, or molded together in uniform manner. For example, shapes include being non-circular, or curved with indentations (such as characters) in the surface. The food bar may be pressed into a flat circular shape, but since the compressing essentially "molds" the bar, the press and the cup holder can be configured to mold the bar into any suitable shape, such as flat and non-circular, or curved with indentations (such as characters) in the surface. In this example, the press 168 comprises a circular cylinder with the flat face, but it is contemplated the press 168 have a non-circular element and non-flat, shaped, raised, or indented face.

The cup holder, cutter and press may be sized to produce a single serving bar, which is typically between about 1 and 18 ounces.

The cup holder 118 is lifted and lowered by the threaded rod 138 which is part of a vertical lift assembly 144. The vertical lift assembly 144 includes a mechanical gear train comprising nut 145, bevel gear for lift 139*d*, and a gear for conveyor rotation rotating sleeve 139*c* as shown. Other mechanical implementation is anticipated. Vibrational effects and torsion effects to the cup holder from the cutting station are reduced by small plate 142 which is located directly above the motor 135*c* for the cutting station 134. The small plate 142 includes a flat planar member that is raised above the rotating frame 132 and the motor 135*c* by a plurality of small support bar members 143. At least some of the vertical and horizontal movements or vibrational and torsional effects exerted in the cutting station are absorbed by the small plate. A space is provided between the top of the motor 135*c* and the small plate so that excessive vertical movement of the cutting connector can be stopped by the small plate if necessary.

Instead of receiving food directly, the cup holder 118 may receive a removable cup that is shaped in a manner that is similar to the cylindrical hollow so as to conform to interior surface walls and bottom surface of the containment. The removable cup may be made of a reusable material (e.g., plastic, metal, etc.) or a disposable liner (e.g., paper, aluminum, etc.). The removable cup may be of a stiff material, such as plastic or pressed cardboard, or a flexible material such as a foil or paper wrap. Other materials are contemplated, but plastic and paper materials are inexpensive and easy to form.

Sensory Movement

Figure 7:
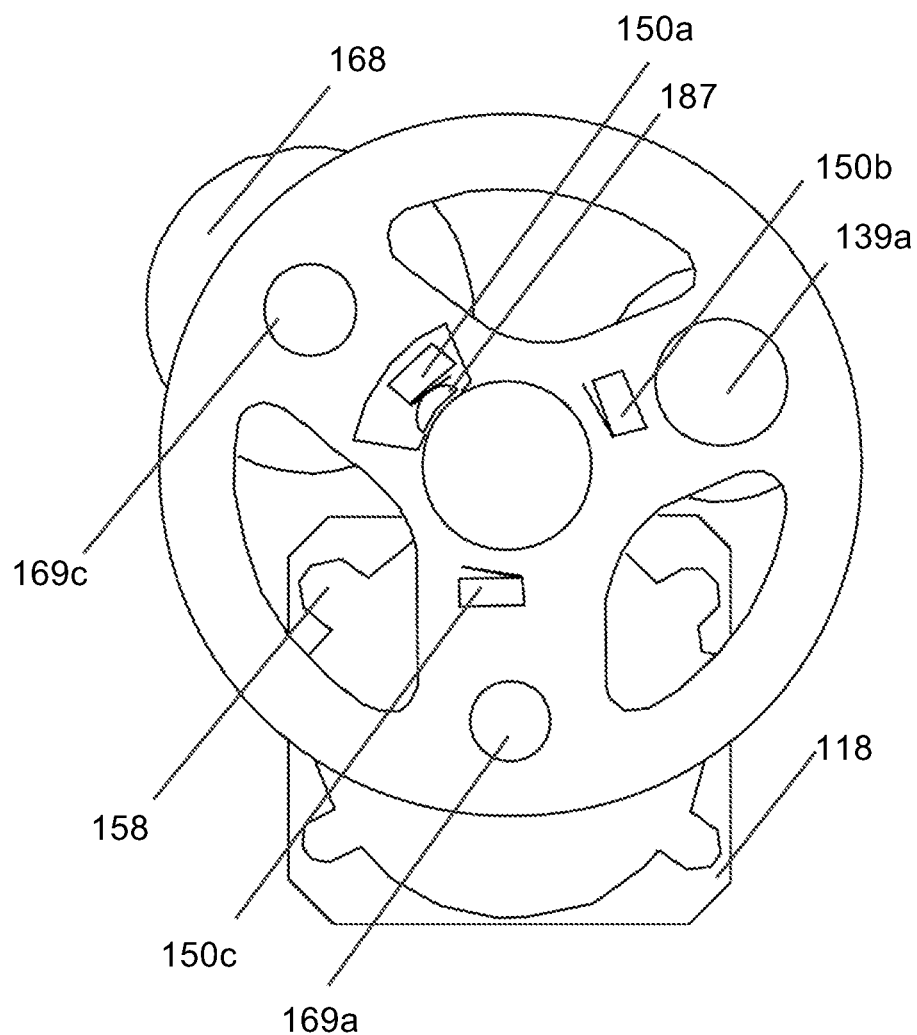
FIG. 7 is a top view of an exemplary rotating frame.
Figure 8:
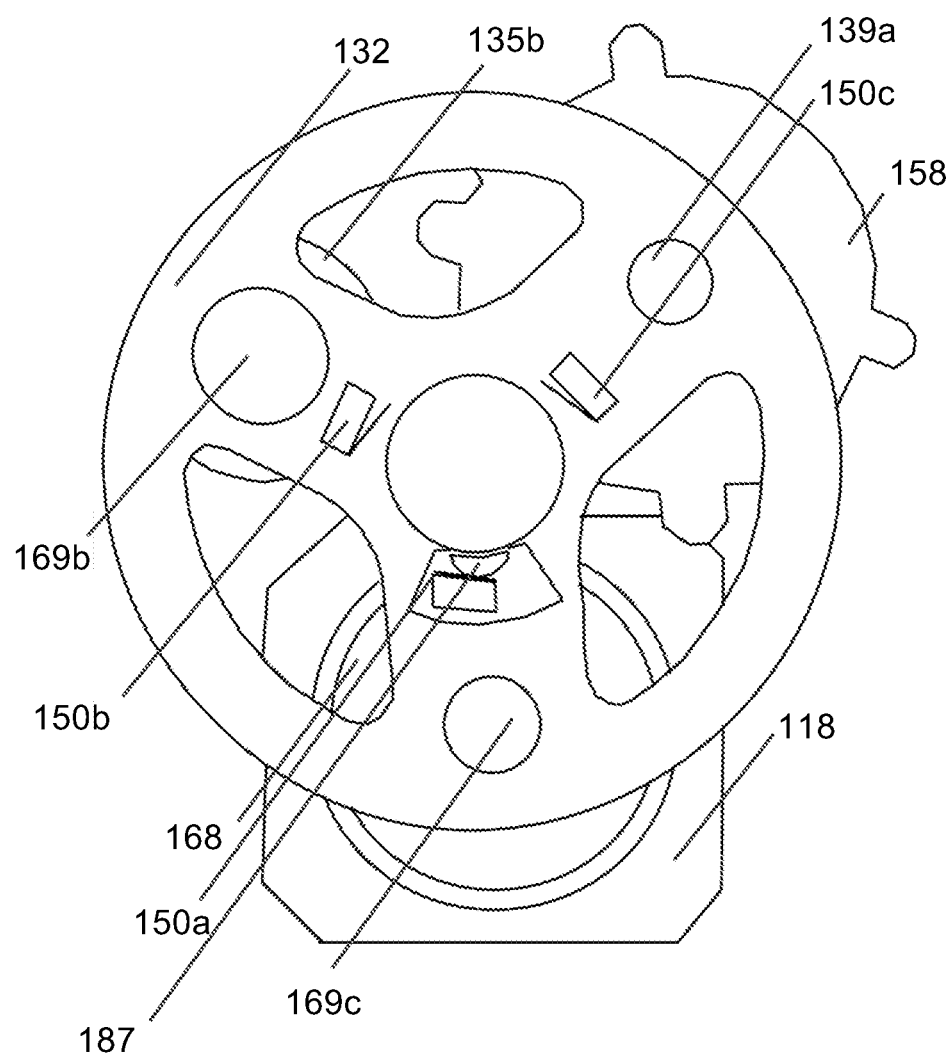
FIG. 8 is a top view of an exemplary rotating frame.
Figure 9:
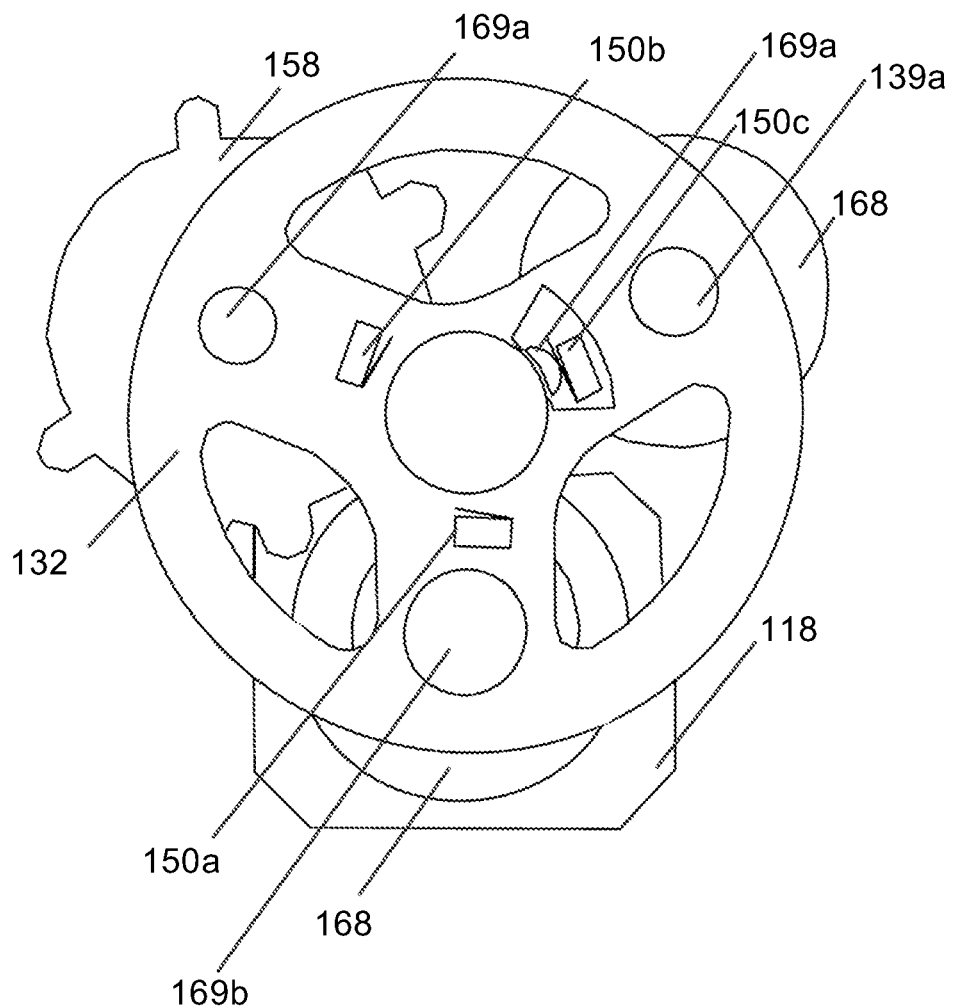
FIG. 9 is a top view of an exemplary rotating frame.
Figure 10:
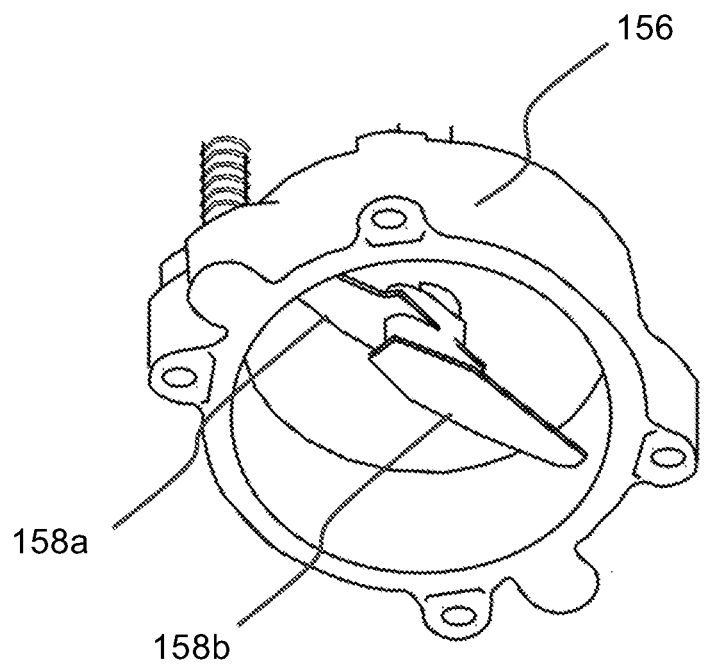
FIG. 10 is a perspective view of an exemplary cutting sleeve and cutter.

The motor assembly is attached at or near edges of a rotating frame at an equal distance from the cutter/cutting sleeve and the pressing station. Turning to FIGS. 7, 8, and 9, microswitches 150a, 150b, and 150c on rotating frame 128 signal the position of the cutting station 134 and the pressing station 133 relative to the cup holder 118. The signal of the microswitches is activated when the microswitches come into contact or engage in other type of communication with the cam 187.

There is also an electrical current sensor in line with the lift motor wires. The current in the motor is directly proportional to the press force, so this sensor is used to measure and control press force (albeit indirectly). There are also 2 motor controllers not pictured but that are part of the electronics.

The Cutting Station

The cutting station 134 includes a cutter 158 disposed within a cutting sleeve 156 and a motor assembly that drives the cutter 158. In the cutting mode, the cup holder 118 is pressed against the cutting sleeve to be generally held stationary at a fixed height while the cutter 158 is moved (e.g., rotated, vibrated, displaced, etc.) to allow cutting blades on the cutter 158 to move into and cut the food contents. However, the cutter 158 and the cup holder 118 may be stationary or movable to effect this movement. Additional motors are anticipated as necessary to achieve the movement. Cutting blades in the cutter may be operating as the cup holder and the cutting station are moving together, or after the cup holder and the cutter are fully together. In the former instance, the cutting blades may be configured to throw or direct cut food contents toward and into the cup holder.

Figure 11:
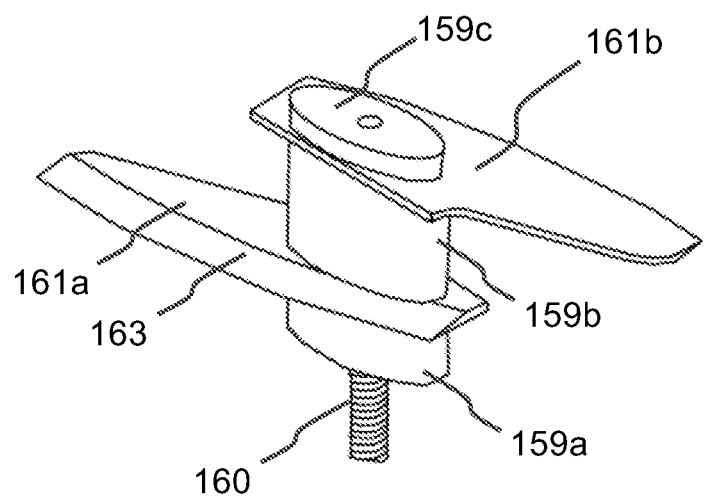
FIG. 11 is a perspective view of an exemplary cutter.
Figure 12:
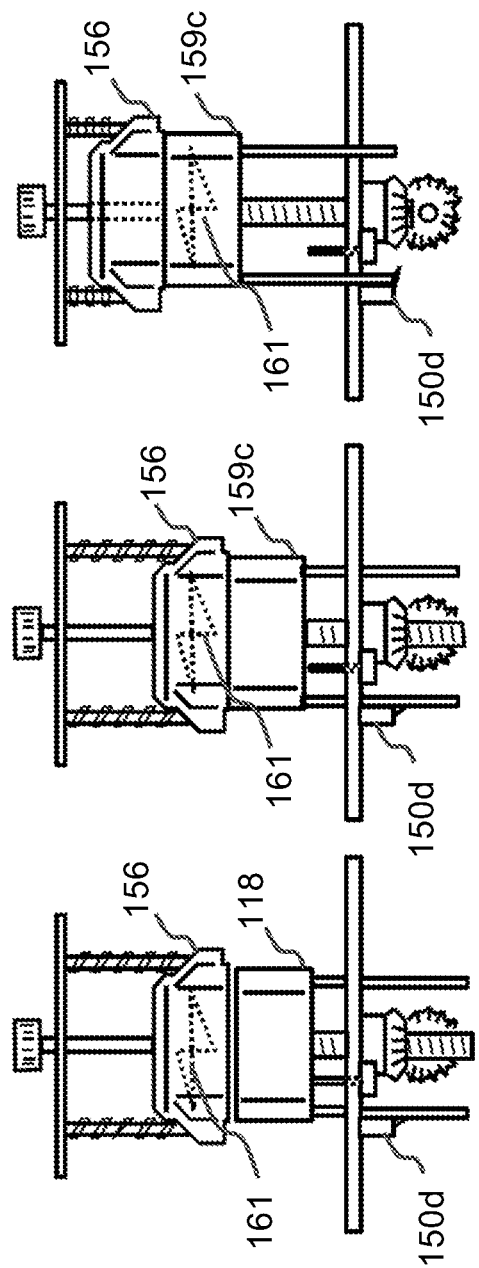
FIG. 12a is a parked position of an exemplary cutting station.
FIG. 12b is a contact position of an exemplary cutting station.
FIG. 12c is a cutting position of an exemplary cutting station.
Figure 13:
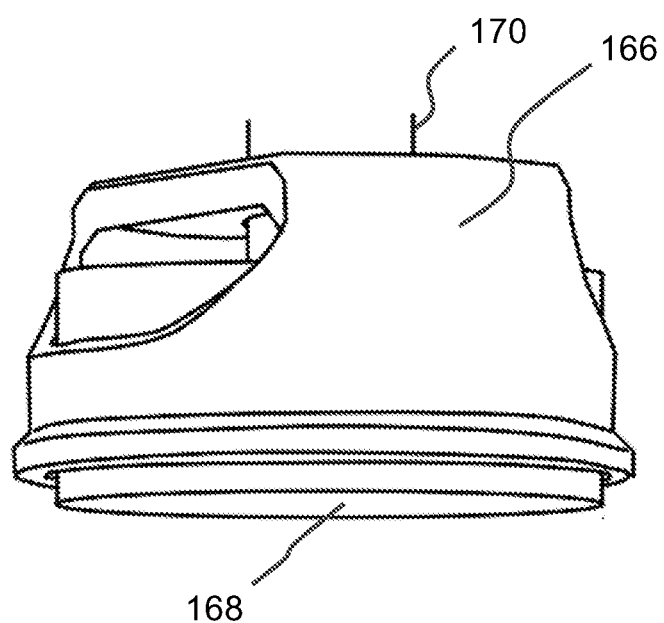
FIG. 13 is a perspective view of an exemplary press.

The cutter 158 may comprise a single blade or a plurality of spinning blades like the blades 161a and 161b shown in FIG. 11 or another type of blade. The cutting sleeve 156 comprises a hollow cylindrical body of greater diameter than a length of the blades as shown in FIG. 12. Edges of the cutting sleeve extend near, at, or below edges of the blade. The primary purpose of the motor is to drive the cutter 158 when the cutting sleeve 156 is engaged with the cup holder.

FIGS. 12a, 12b, and 12c illustrate various positions of the cutting station and cup holder involved for the process of cutting the food contents. As discussed previously, the cutting station includes a connector rod that extends downward from the rotating frame. The cutting sleeve is slidably engaged to the connector rod. The cutter is attached to the free end of the rod. The cutting station further includes connectors with spring dampeners at opposite ends so as to be diametrically opposed. The connectors are also attached to the rotating frame and also extend downward. The cutting sleeve is slidably engaged to these connectors as well. The spring dampeners on the connectors exert force to move the sleeve to its original state and provide stability for the rotational movement of the cutter. The spring dampeners further provide a dampening effect to the upward force of the cup holder.

In FIG. 12a, a parked position includes the cup holder 118 in axial alignment with the cutter and cutting sleeve. This is a result of the rotating frame rotating the cutter and cutting sleeve around in a circle and stopping when there is an alignment. In FIG. 12b, a contact position includes the cup holder having been raised to contact edges of the cutting sleeve. This is a result of the vertical lift assembly lifting the cup holder while the cutter and cutting sleeve are held fixed above the cup holder. In FIG. 12c, a third position includes the cutting sleeve raised to a height of the cutter or above a top of the cutter. This is a result of the lift assembly raising the cup holder so that the cup holder is pressed against the cutting sleeve. The cutting sleeve is movable vertically upward relative to the cutter. The force exerted by the cup holder through the lift assembly pushes the cutting sleeve upward while the cutter remains stationary. An example cup holder is lifted upward so as to surround the cutter like putting together an inverted food processor. The spring dampeners and the lift assembly push against each other, creating a seal between edges of the cutting sleeve and edges of the cup holder. The food contents within the cup holder are cut within the interior of the cup holder by the cutter.

After the cutting of food is complete, positions are reversed, with the vertical lift assembly lowering the cup holder and the spring dampener forcing the cutting sleeve to return to its former resting state with the cutting sleeve surrounding the cutter. The cutting station resumes its state of being a vertical distance away from the cup holder. Alignment between the cutting station and the cup holder is removed as the rotating plate rotates the cutting station around in a circle.

The Cutter

The cutter 158 includes at least one cutting blade that cuts the food contents within the cup holder 118. In FIG. 11, an exemplary cutter 158 is shown with a first and second blade 161a and 161b, each having a generally flattened, elongated body that is attached to a common spinner rod 160.

The spinner rod 160 comprises an elongated rod that extends vertically downward, or perpendicular, relative to the cutting sleeve 156 and the rotating frame 132. Joinders 159a, 159b, and 159c buttress the blades 161a and 161b, providing separation or holding ends of the blades 161a and 161b in place. The spinner rod 160 is driven by the motor 135b on the rotating plate to spin the two blades. The spinner rod 160 attaches to ends of the two blades 161a and 161b extending radially outward from the spinner rod in opposing directions and in a generally horizontal manner. The blades 161a and 161b are separated along the length of the spinner rod 160 by a fixed height. As shown, the two blades 161a and 161b each have a contoured, slightly curved, outer facing edge. Also, the two blades each have a notch in the mid-section of the inner facing edge. Blade 161a is longer than the second blade 161b and has a honed beveled edge 163, or in other words, is angled steeply on one side, to make it sharp. The first blade 161a also has a pointed edge at its free end, while the second blade 161b has a curved inner edge that meets the outer edge, making the second blade 161b have a rather blunt end on its free end.

The spinner rod 160 includes a uniform oval, or elliptical, cross section along its axial length. The long length of the oval cross-section extends in a generally horizontal manner parallel to the extension of the blades. The long length of the oval cross-section is less than half the length of the blade. Alternatives include that the cross-section of the rod be circular or have other shapes and contours that optimize performance of the blade.

Variations of the cutter include having a single blade, two blades with the same shape, or two blades with different shapes than the ones described. In one example, there could be three blades that extend from the spinner, equally spaced apart. In another example, there could be four blades with two pairs of blades extending in opposite directions.

More than one edge may be sharp and may be serrated. Also, variations include that the blades be attached to the spinner near or at a mid-section of the body of the blade or attached offset from the mid-section of the body of the blade.

One or more of the blades may have a slightly honed beveled edge or a steeply downward facing angle relative to a horizontal plane of the body of the blade, in a range of 0-15 degrees, 15-25 degrees, 25-30 degrees, 30-45 degrees, and 45-60 degrees. Alternatively, one or more of the blades may have a slightly upward facing angle relative to a horizontal plane of the body of the blade, in a range of 0-15 degrees, 15-25 degrees, 25-30 degrees, 30-45 degrees, and 45-60 degrees.

Instead of extending radially outward from the spinner rod in opposing directions and in a generally horizontal manner, the blades may incorporate a curved extension that turns slightly upward or downward, inward or outward.

With one blade being slightly raised above the other blade by a fixed height as shown, the vertical distance may be a range of 0-1.5 mm, 1.5-3 mm, 3-3.5 mm, 3.5-5 mm, 5-6.5 mm, 6.5-8 mm, 8-9.5 mm, 9.5-11 mm, 11-12.5 mm, 12.5-14 mm, and 14-15.5 mm. Alternatively, the blades may be on the same planar level with each other. Instead of two blades, there may be a plurality of blades exceeding only two. Also, there may be a single blade.

The Pressing Station

The pressing station 133 includes a connector rod 170 that extends downward from the rotating frame 132 toward the bottom plate 130. At the free end of the connector rod 170, a press 168 is attached. The press 168 comprises a cylinder with a flat base. The press 168 is disposed within a press sleeve 166 that is slidably engaged to the connector rod 170. The press sleeve 168 comprises a hollow cylindrical body of greater diameter than the cylinder diameter of the press 168. The press 168 slidably fits within the press sleeve, edges of the press sleeve extending at or near edges of the flat base of the cylinder.

The connector rod 170 continues through and upward from the rotating frame 132, to within a small clearance with the top plate 126. During activation of the pressing station 168 compression forces are transmitted up through the connector rod 170. Rather than the rotating frame 132 bearing all of this force, slight distortion of the rotating frame 132 allows the top of the connector rod 170 to bear against the top plate 126, which distributes the force to intermediary members, as well as the bottom plate 130. The small clearance is sufficient to still allow for rotation of the rotating disc 132 when the pressing station is not activated.

FIGS. 14a, 14b, and 14c illustrate various positions of the pressing station and cup holder in action. In FIG. 14a, a parked position includes the cup holder 118 in axial alignment with the press 168. This is a result of the rotating frame 132 rotating the press 168 around in a circle and stopping when there is an alignment between the cup holder 118 and the press 168. In FIG. 14b, a contact position includes the cup holder 118 having been raised to contact a downward facing surface of the press sleeve 166. This is a result of the vertical lift assembly lifting the cup holder 118 while the press 168 is fixed above the cup holder 118. In FIG. 14c, a press position includes the press sleeve 166 raised to a height at or below the height of the press 168 or above a top edge of the press 168 by the raising the cup holder 118 and forcing the press sleeve 166 upward. This is a result of the lift assembly raising the cup holder 118 to surround the press 168, the food contents within the cup holder 118 being pressed into the bar shape by the flat base of the cylinder of the press 168 as the cup holder 118 is being raised.

After the pressing of food is complete, positions are reversed, with the vertical lift assembly lowering the cup holder 118 and the spring dampener 167 of the pressing station 133 forcing the press sleeve 166 to return to its former resting state with the press sleeve 166 surrounding the press 168. The pressing station resumes its state of being a vertical distance away from the cup holder 118. Alignment between the pressing station and the cup holder 118 is discontinued as the rotating frame 132 rotates the pressing station around in a circle.

The Controls

The device is controlled by a user interface that is capable of presenting information to a user and receiving input from a user. In FIGS. 14a and 14b, a touch-enabled display interface 104 is shown on the exterior surface of the device. The participant can press various controls to make a desired food bar. For example, a control button such as the "MAKE" button 192a allows the user to start the food bar making procedure.

A control button such as the "STORE" button 192b puts the device in a stored mode. A stored mode is a mode that configures the components so as to prevent movement of the components. This allows the device to be moved and handled without disturbing or breaking internal components. An exemplary stored position includes the cup holder and press sleeve being vertically raised so that the press is positioned within the hollowed containment. This position prevents the rotating frame from rotating, tilting, becoming out of general alignment, or otherwise becoming unusable. It also keeps the rotating frame locked with the bottom layer.

Another control button may be used to re-press the food contents within the container as desired.

Another control button is used to select the degree of coarseness. This can include a variable degree from "COARSE" button 192c to "FINE" button 192d with an array of intermediate buttons 193a as shown in FIG. 14b.

Another control button is used to select the degree of force used by the press. This can include a variable degree from less to more as represented by "LESS" button 192e and "MORE" button 192f with an array of intermediate control buttons 193a as shown in FIG. 14b.

The press is intended to compress the food contents together sufficiently to form a "bar" with the components adhering to each other sufficiently for normal handling and consumption. The extent of the compression (pressure and time) depends on several properties of the food contents, but involves moisture content, with a higher moisture content requiring less compression. The controller may be programmed to allow user selection of the extent of the compression, and to allow additional compression in the event the initial compression was insufficient.

A range of force includes 400-500 lb, 500-600 lb, or 600-1000 lb, depending on the consistency of the bar required, the coarseness, and fineness. The top of the the cup is filled less than the top (e.g., ⅔ full, ¾ full, ⅝ full, and a range between ⅔ to ⅝, etc.) in order to maintain adequate room in the cup for the pressure.

It is contemplated that the system may be used to make food bars, uncooked patties, animal treats, and other foodstuffs by selection of appropriate food ingredients, and by making appropriate modifications to the system.

A method for making a single serving food bar comprises providing a cup holder in a loading mode, containing a food stuff in the cup holder, receiving user signal by a processing controller system to initiate automatic processing, bringing by automatic processing the cup holder into alignment with a cutting station, closing by automatic processing the cup holder and the cutting station into an operable configuration for cutting the food stuff, bringing by automatic processing the cup holder into alignment with a pressing station, closing by automatic processing the cup holder and the pressing station into an operable configuration for compressing the foodstuff, bringing by automatic processing the cup holder to loading mode, and removing the food-stuff from the cup holder.

The loading mode involves moving the cup holder from alignment with either the cutting station or the pressing station. The loading mode further includes having the cutting station, or the pressing station, unclosed sufficiently to permit user placement of food in the cup holder. Bringing into alignment is achieved by moving the cup holder and the respective cutting station or pressing station do not move. The cup holder is moved by a rotating or a linear moving frame. Bringing into alignment may be achieved by moving the respective cutting station, and pressing station, and the cup holder does not move. Variations includes that the cutting station, and pressing station be moved by a rotating or linear moving frame. Bringing into an operable configuration includes moving the respective cutter station or pressing station toward the cup holder. Also, bringing into an operable configuration comprises moving the cup holder toward the respective cutter station or pressing station.

Example 2

Linear Conveyor

Another exemplary device will not be illustrated with reference to FIGS. 18 to 24.

The device includes a housing and within the housing is contained a cup holder that alternates positions between a cutting station and a pressing station by means of a conveyor assembly that is controlled by a control unit. The conveyor assembly includes a linear assembly that moves the cup holder 318 back and forth between the cutting station 334 and the pressing station 333 to change respective station alignment with the cup holder. The device further includes a cutter vertical lift assembly 344 that lowers cutting station to be operably connected to the cup holder, and a press vertical assembly 444 that lowers the pressing station to be operably connected to the cup holder and compress the contents of the cup holder. The various movements and acts are controlled by a control unit, the control unit.

Cutting Station

The cutting station 334 includes a cutting motor 335*a*, cover or sleeve 356 that fits over the cupholder when in the cutting position, Also included is a cutter vertical lift assembly 344 that lowers the cutting station into a position to cut contents of the cupholder.

Pressing Station

The pressing station 333 includes a press 368 and a press vertical lift assembly 444 that allows lowering of the press into the cupholder to compress the contents and withdrawing the press by lifting from the cupholder.

Linear Conveyor

The linear conveyor assembly uses a motor (not shown) to move the cupholder on rails 394 back and forth from alignment with the cutting station or with the pressing station.

Controller

Figure 15A:
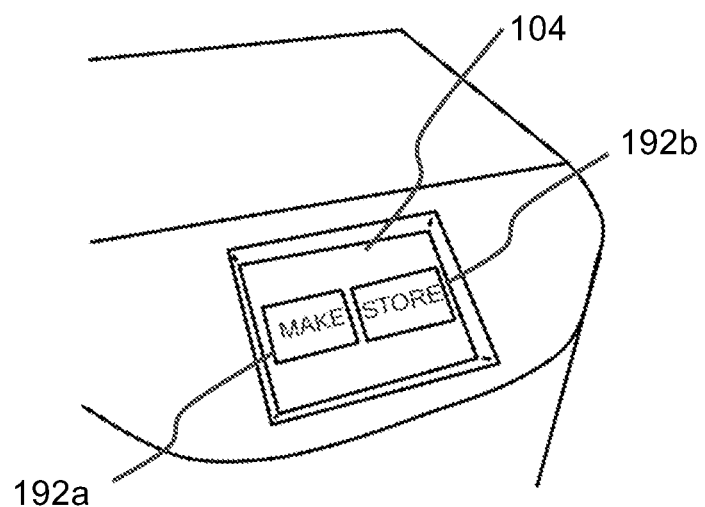
FIG. 15a is an exemplary view of a user interface control display.

The basic steps are shown in FIG. 15*a*, which include step 211 of loading the contents into the cup holder, step 212 of cutting the contents within the cup holder, step 213 of compressing the contents within the cup holder, and step 214 of unloading the fully finished ready-to-eat bar. An initial step of inserting a removable blade assembly into a blade receptacle may also be included. The receptacle is engaged by pushing the blades up until they click into place.

Figure 17:
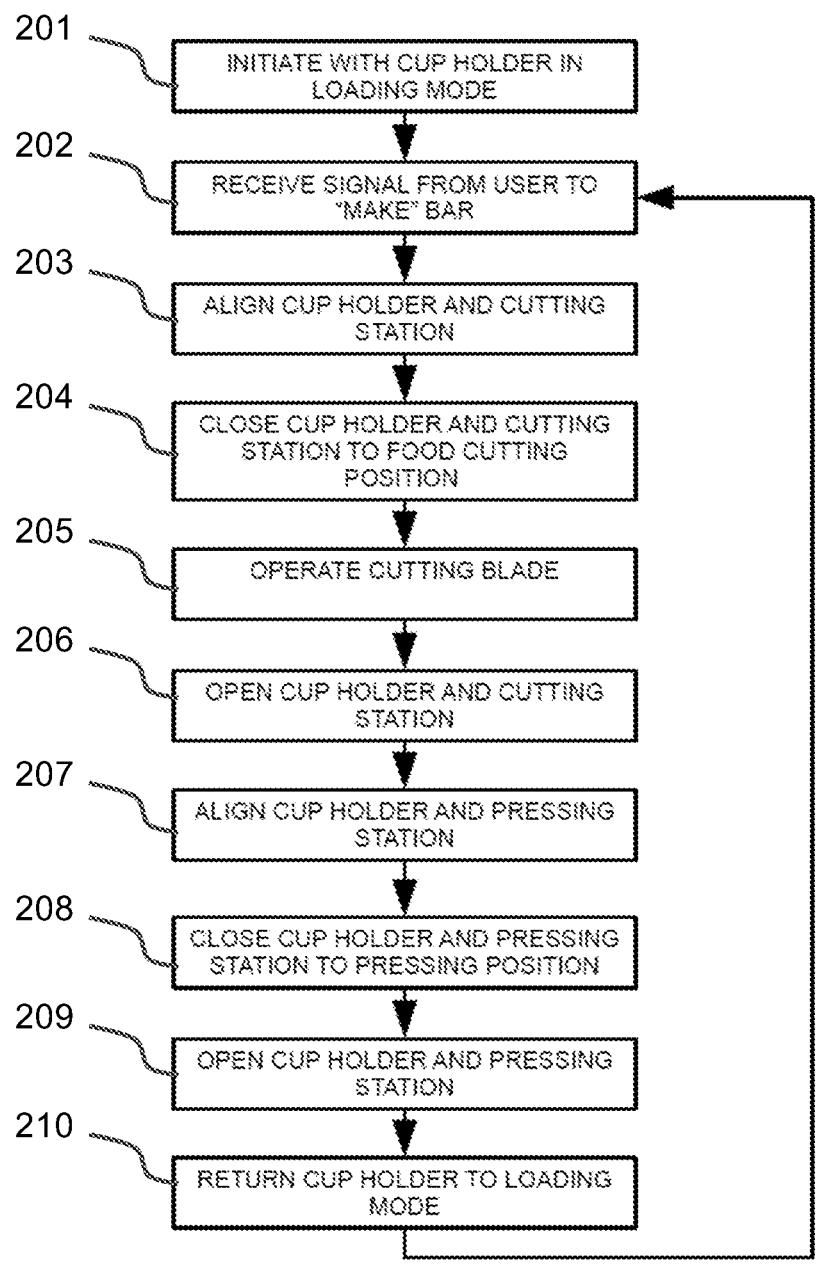
FIG. 17 is an exemplary view of a flow chart.
Figure 18:
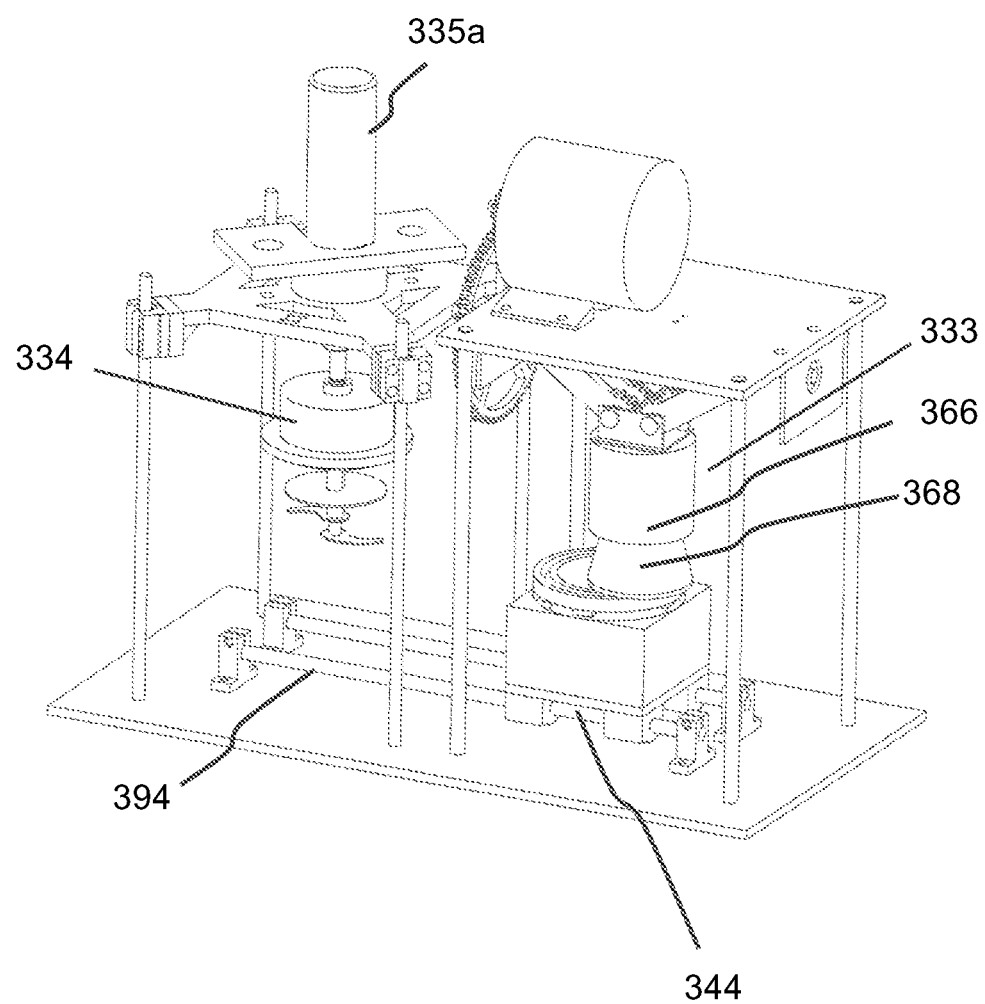
FIG. 18 is an exemplary view of a linear system.
Figure 19:
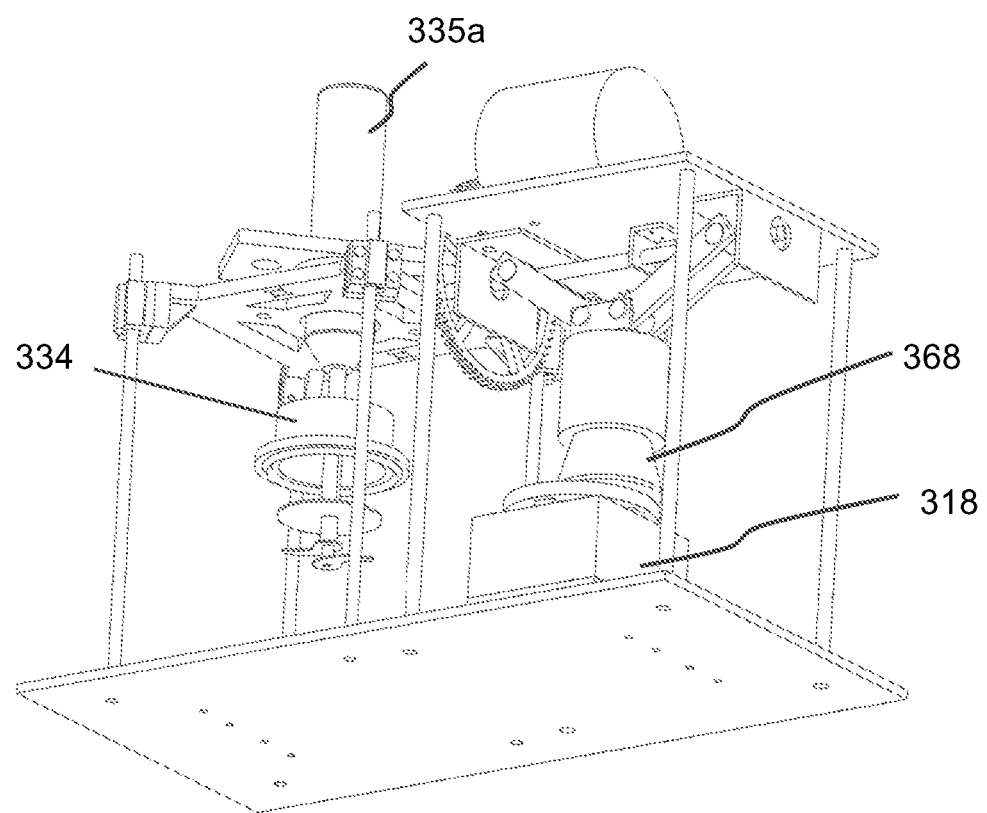
FIG. 19 is an exemplary view of a linear system.
Figure 20:
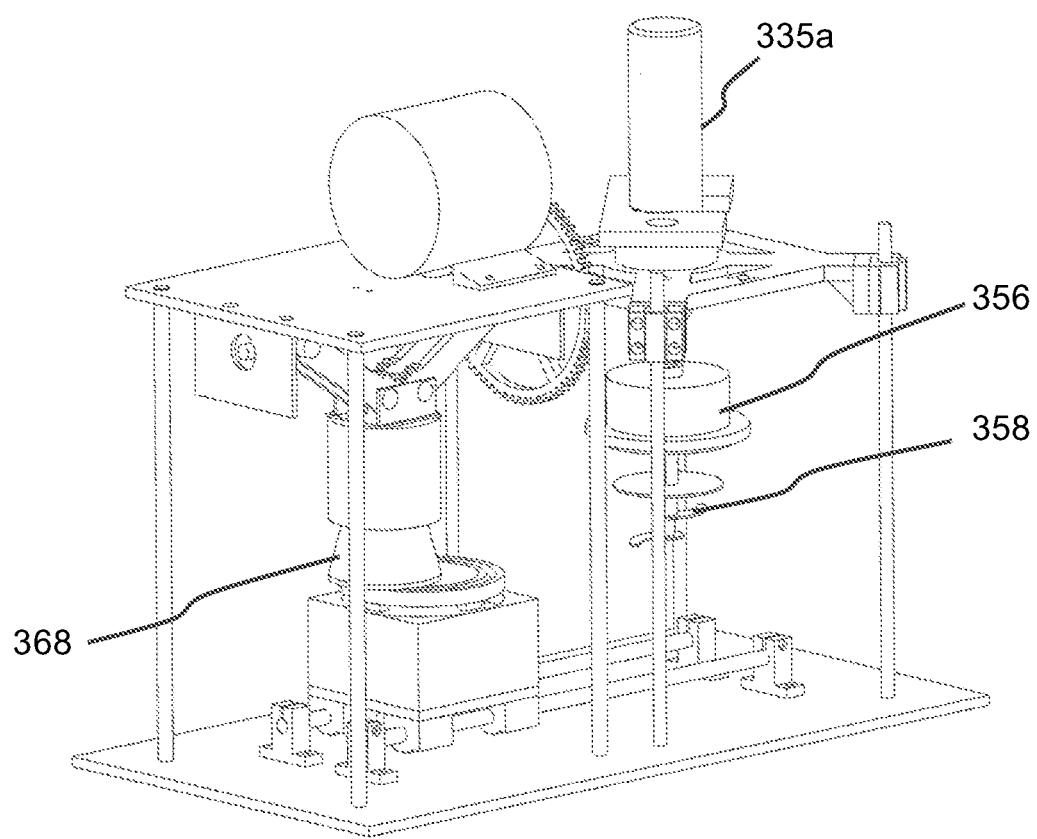
FIG. 20 is an exemplary view of a linear system.
Figure 21:
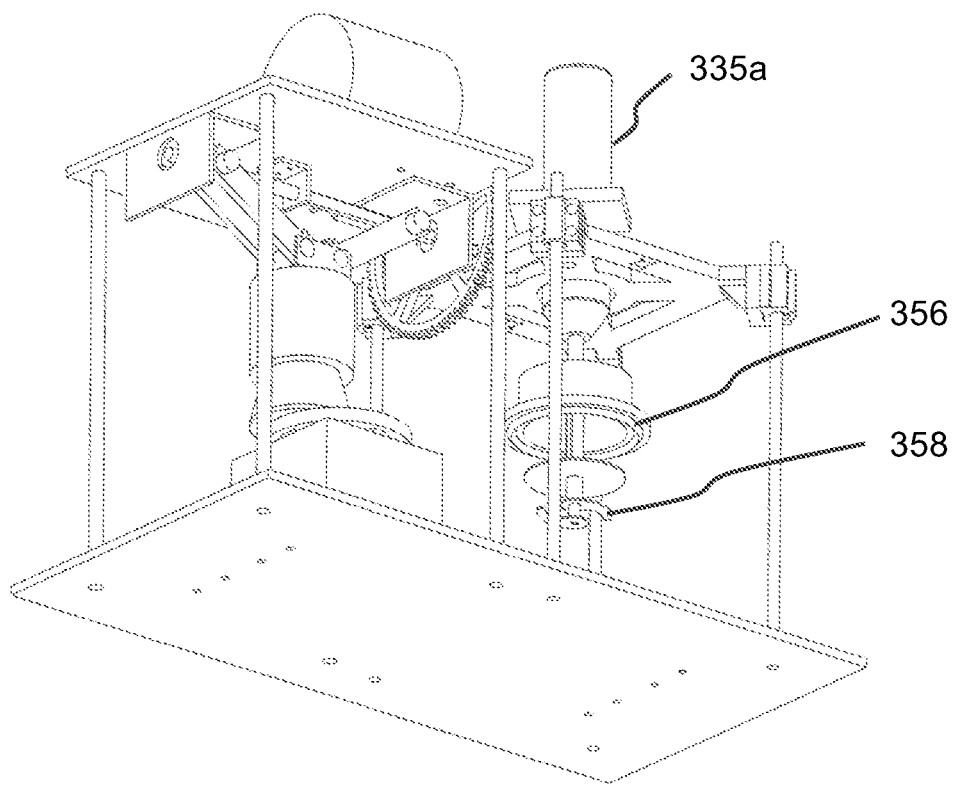
FIG. 21 is an exemplary view of a linear system.
Figure 22:
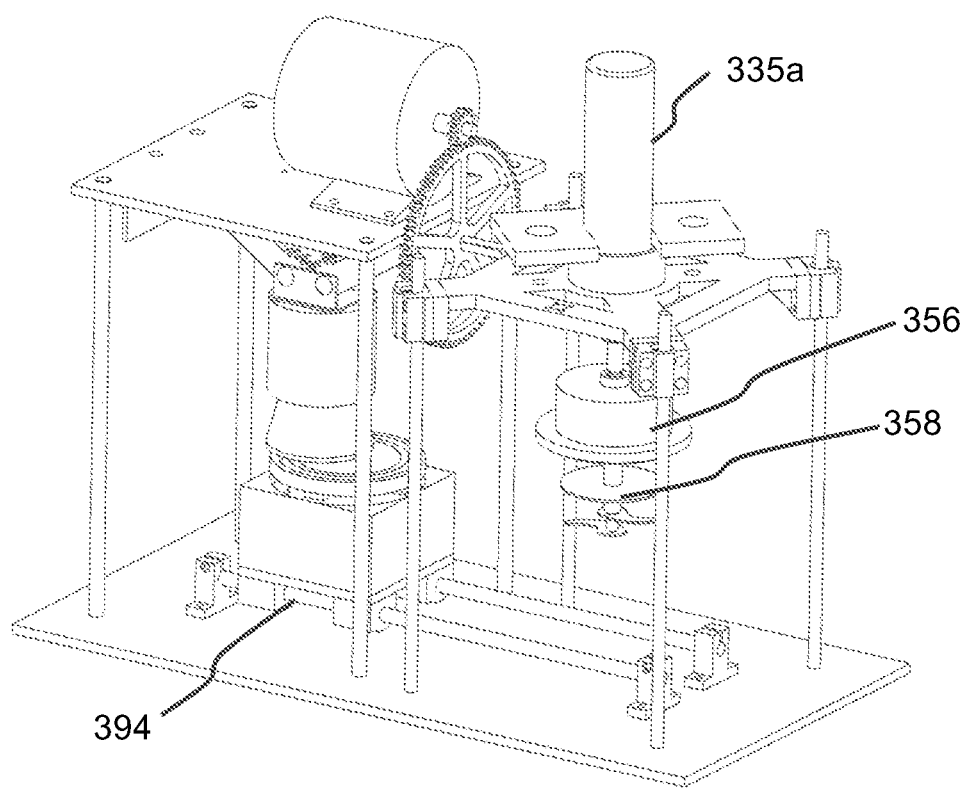
FIG. 22 is an exemplary view of a linear system.
Figure 23:
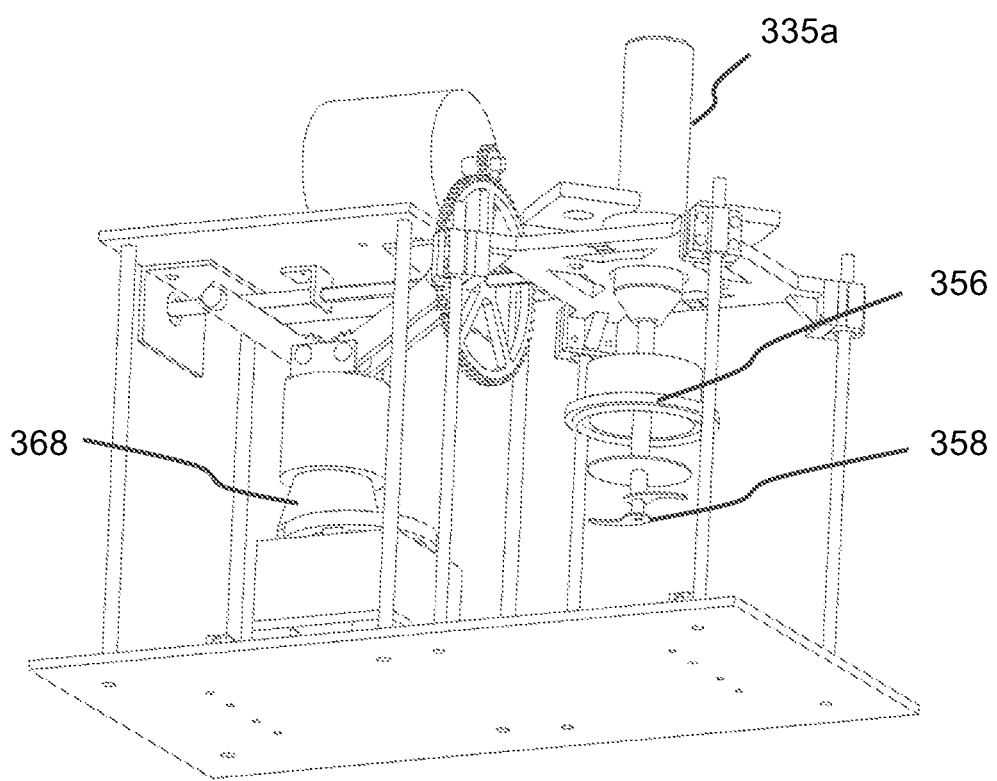
FIG. 23 is an exemplary view of a linear system.
Figure 24:
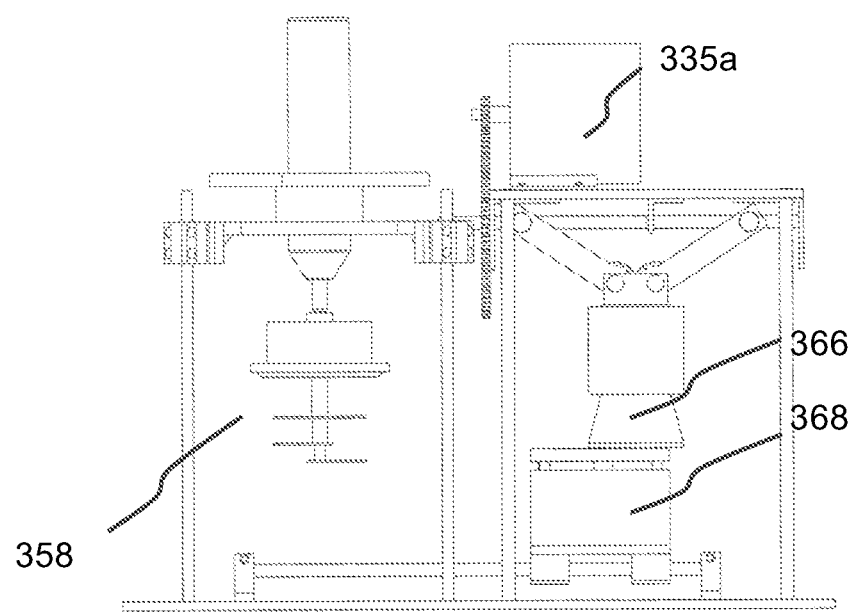
FIG. 24 is an exemplary view of a linear system.

For either example, the circular conveyor or the linear conveyor, a controller (not shown) controls the respective circular or linear movement of the conveyor and the vertical movements of the cutting station and the pressing station. From the perspective of the control side of things, the exemplary device is operated in the following manner as shown by flowchart in FIG. 17:

The electronics and motors first initialize, as indicated by step 201. The position of the rotating frame is calibrated to be in a startup or load position which is where the cutting station and pressing station are rotated away from the access door allowing the user to freely place food or a food cup in the cup holder. The cup holder is thus in a loading mode. After food and/or cup is placed in the cup holder and the hatch closed, the controller waits in standby to receive further instructions.

In step 202, the controller receives a signal from a user to activate the device. For example, the user may select the "MAKE" option (FIG. 15*a*). Further selections may also be made, such as a selection for the desired texture. The user may press texture/consistency control buttons. The settings for operation determine the consistency and texture of the bar. For example, the texture/consistency can be set to: chunky, medium, fine, or the like. The fine position is set to run/blend for a longer duration than the crunchy, and the pulse runs for a duration determined by the user.

Default options may be used if no selection is made. The device responds by presenting an indicator to the user to show that the device is active.

In step 203, the stepper motor for rotating the frame is activated to rotate the rotating frame until a micro switch indicates that the rotating frame is in the cutting position.

In step 204, the cup holder is then raised to engage the respective magnets on the cutter sleeve and the cup holder. This is the food cutting position.

In step 205, the cutter motor is then started. In an exemplary operation, the cutter, such as a cutting blade described herein, is started slow and then accelerated later. In some embodiments, the cup may be raised to an upper limit (as indicated to the controller by micro switch 150*d*). The cutter motor may then be accelerated and allowed to cut for the specified amount of time set in the "TEXTURE" setup menu of FIG. 15*b*. The cutter motor is slowed down until stop, and the cup is lowered to its lowest extent (as indicated to the controller by micro switch 150*e*). The cutter motor may optionally continue to spin after the cup is lowered from the cutter to spin off any food on the blades.

In step 206, the cup is lowered and fully disengaged with the cutting station.

In step 207, with the cup lowered, the stepper motor for rotating the rotating frame is then activated to rotate the frame to the pressing position (as indicated to the controller by micro switches 150*a*, 150*b*, and 150*c*).

In one variation, after pressing the control button choice for texture, the controller and the machine electronics lower a spinning set of 2 blades down into the cup in the cup holder. The blades aggressively break down the food particulates and blends them into the desired texture and consistency. In another variation, both the blades and/or cutting sleeve and the cup holder move towards each other for processing of the contents.

After blending and mixing is completed, the controller signals the cutting vertical lift assembly to retract the cutting station upward and completely out of the silicone cup. For a circular conveyor, the cutting station rotates on the circular disc until the press station is aligned with the cup holder. In the context of a linear conveyor, after the blade completely retracts, the cup holder moves and stops directly below the pressing station. The cup holder moves laterally to the side and stops when it is directly below the pressing station.

In step 208, the cup is raised onto and around the press.

When the cup holder is in position, the press vertical assembly is activated and the cup holder is raised to the press sleeve. The cup holder is pushed against the press. In one embodiment, the press comes down into the cup holder. In another embodiment, the cup holder and the press both apply force against each other. The amount of force may include, for example, 650 pounds of force that presses the bar materials into a hockey puck like shape and size. After pressing the bar, the controller signals the press to retract upward and out of the cup holder.

Figure 15B:
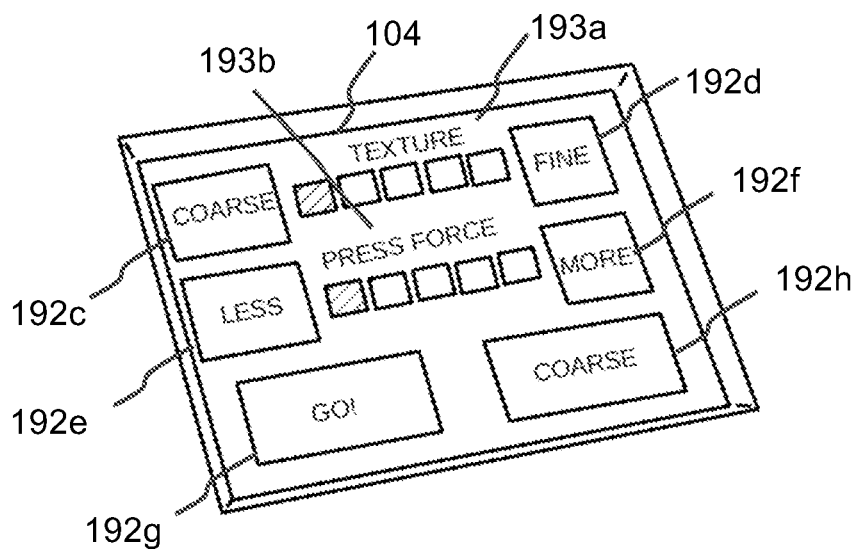
FIG. 15b is an exemplary view of a user interface control display.
Figure 16:
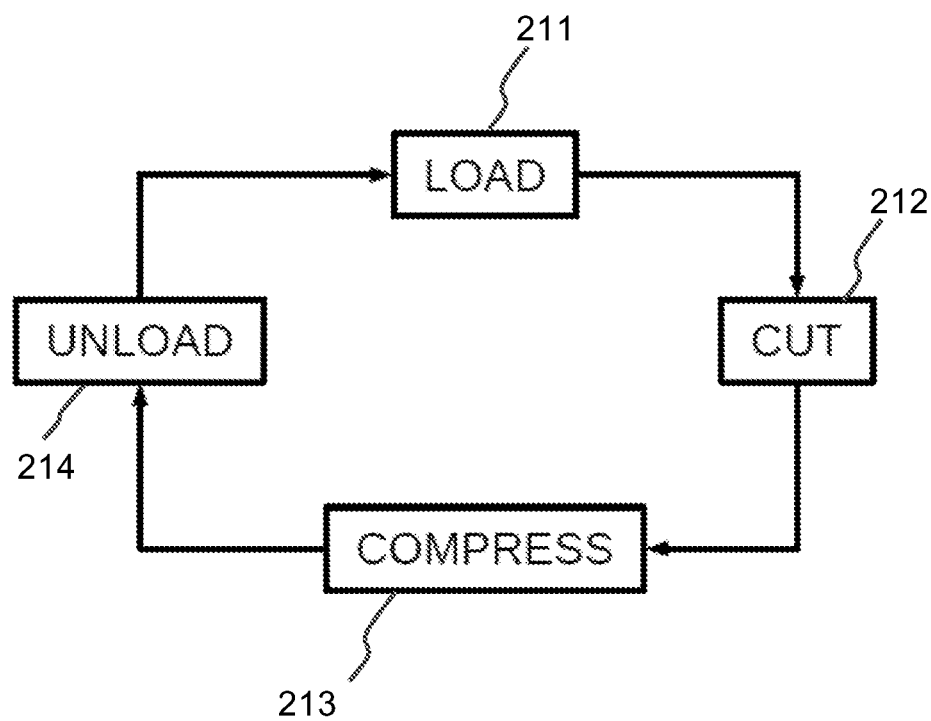
FIG. 16 is an exemplary view of a flow diagram.

The height to which the cup is raised it determined by the value of the preset for "PRESS FORCE" in FIG. 15*b*. In step 209, the cup is lowered, and the rotating frame is rotated to the loading position (as indicated to the controller by micro switches 150*a*, 150*b*, and 150*c*). The display then indicates completion by showing text "FINISHED" or "ENJOY". The user may then open the hatch and retrieve the cup and the completed bar. The food bar is removed manually from the silicone cup by inverting the flexible cup outward by pressing two thumbs on the bottom side of the cup and popping the bar onto a paper wrap.

In step 210, the cup holder is returned to its position of loading mode or stored mode.

Numerous changes can be made to this process. For example, fresh ingredients sold in a pre-packaged form, such as a round hard paper cup or package, by a supplier or other provider, may be placed this cup in the machine's metal housing receptacle. The cup may instead comprise plastic, rubber, silicone, or other material.

The cup dimensions may vary. For example, the cup may be 3" in diameter and 2.5" in height. The diameter may be 3.0-3.5", 3.5-4.0", 4.0-4.5", or 4.5-5.0". The height may be 1.0-1.5", 1.5-2.0", 2.0-2.5", 2.5-3.0", 3.0-3.5", 3.5-4.0", or 4.0-4.5".

In one example, the hard paper cup, or other cup, is kept securely in place at the bottom and at the top. The bottom of the cup has a quarter inch lip that sits reciprocally in place in a quarter inch groove on the machine's metal platform. The cup is held securely in place at its top with an added tapered tension band that is part of the blade assembly. This tension band is approximately 3.5" in diameter at the top and tapers to 2.75" at the bottom where the band engages with the hard paper cup. The tension band is made of $1/16$" thick metal. As the blade assembly moves laterally down into the cup, the tension band moves down with it and engages with the paper cup. Dimensions may vary according to cup dimensions described above.

The tension band may be 2.5-3.0", 3.0-3.5", 3.5-4.0", or 4.0-4.5" in diameter. The taper may be adjusted to 1.75-2.25", 2.25-2.75", 2.75-3.50" taper. The tension band may be $1/18$", $1/16$", $1/14$", $1/12$", and $1/10$" thick metal.

In another variation, in the instance of the linear conveyor, after blending and mixing is completed, the electronics signal the blade assembly to retract upward and completely out of the hard paper cup. After the blade assembly retracts, the metal housing moves laterally to the side and stops when it is directly below the press mechanism. When the cup is in position, the press then comes down into the cup with 650 pounds of force and presses the bar materials into a hockey puck like shape and size. After pressing the bar, the electronics signal the press to retract upward and out of the hard paper cup.

For removing the cup, a variation includes that the final step is to remove the hard paper cup from the metal housing. The food bar is removed manually from the hard paper cup by peeling away the paper from the bar laterally beginning at the tab at the top of the cup and working to the bottom in a circular motion.

The paper is removed in one quarter inch strips until the bar is completely exposed and ready for consumption.

Implementation—Advantages

Advantages to the system include at least the following—

Minimal actuator design. The components require minimal conveyance which benefit from both the cutting station and pressing station being transported in a single unit and the cup holder requiring mere vertical motion.

Separation of machinery/electronics and food. The electronics are maintained above and below the space where the processing of food occurs. This protects the electronics from spillage or the effects of heat and moisture, as well as protection from the movement of the stations and cup holder.

Size. The size of the device is compact which makes it useful for both home and commercial use. The compact size further allows the device to be easily transported and stored.

Speed. The device can prepare a bar in up to less than a minute, or less than 30 seconds. This is beneficial for on-the-go bars and commercial settings as well.

Components. The components are simple to use, handle, program, and smartly distributed within the device.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A system for making a single serving food bar, comprising:
   a cup holder;
   a cutting station with a cutter that is configured with a cutting mode to cut food contents within the cup holder when the cup holder is operably at the cutting station;
   a pressing station with a press that is configured with a pressing mode to compact the food contents within the cup holder when the cup holder is operably at the pressing station;
   a conveyor for changing the alignment of the cup holder between being operably connected to the cutting station and being operably connected to the pressing station; and
   a controller for actuating in sequence (1) the cutter into the cutting mode, (2) the conveyor to change the alignment of the cupholder to be operably at the pressing station, and (3) the press into the pressing mode.

2. The system in claim 1, the conveyor further comprising:
a vertical lift mechanism that raises and lowers the cup holder relative to the cutting station and the pressing station.

3. The system in claim 1, the conveyor further comprising:
a rotating frame that is attached in an offset axial alignment with the cup holder, the cutting station and the pressing station attached to the rotating frame so as to rotate on the frame in a circular manner with respect to the cup holder.

4. The system in claim 3, further comprising two vertical mounts that extend downward from the rotating frame, the cutting station slidably engaged to a first vertical mount, and the pressing station slidably engaged to a second vertical mount.

5. The system in claim 3, wherein the cutting station, pressing station, and a motor for powering the system are equi-axially spaced apart on the rotating frame.

6. The system in claim 2, the conveyor further comprising a dampening structure on the cutting station and the pressing station, the dampening structure configured to act against vertical displacement of the cutting station and the pressing station relative to the vertical lift mechanism.

7. The system in claim 1, further comprising a housing frame in which the cup holder, cutting station, pressing station, and electronics are contained as a single stand-alone unit.

8. The system in claim 1, the cutting station further comprising:
a vertical mount, and
a cutter sleeve slidably engaged to the vertical mount, the cutter sleeve being raised and lowered by the vertical lift mechanism with respect to the vertical mount.

9. The system in claim 8, further comprising:
a first position with outer edges of the cutter sleeve positioned a distance above the cup holder;
a second position with outer edges of the cup holder raised by the vertical lift mechanism so as to contact outer edges of the cutting sleeve;
a third position with the cutter sleeve and cup holder raised by the vertical lift mechanism with the cutter remaining stationary and effectively lowered within the cup holder so as to be positioned within the cup holder.

10. The system in claim 1, the pressing station comprising:
a vertical mount;
a cylindrical stem attached at the end of the vertical mount; and
a press sleeve slidably engaged to the vertical mount, the press sleeve being raised and lowered by the vertical lift mechanism with respect to the vertical mount.

11. The system in claim 10, further comprising:
a first position with outer edges of the press sleeve positioned a distance above the cup holder;
a second position with outer edges of the cup holder raised by the vertical lift mechanism so as to contact the outer edges of the press sleeve;
a third position with the press sleeve and cup holder raised by the vertical lift mechanism with the cylindrical stem remaining stationary and effectively compressed against the cup holder and any food contents therein.

12. The system in claim 1, further comprising at least one blade included in the cutter.

13. The system in claim 12, wherein the blade includes at least one serrated edge.

14. The system in claim 10, wherein the cylindrical stem includes a free end that has a flattened surface.

15. The system in claim 1, further comprising:
a plurality of magnets located on at least one downward facing surface of the cutter sleeve and the press sleeve, and
a corresponding plurality of magnets located on an upward facing surface of the cup holder, the plurality of magnets and corresponding plurality of magnets configured to align with each other when either the cutter sleeve is in contact with the cup holder or the press sleeve is in contact with the cup holder.

16. The system in claim 1, further comprising a shield that is positioned to separate the cup holder, the cutting station, and the pressing station from electrical components that power the system.

17. The system in claim 2, the lift mechanism further comprising a geared motor system that raises and lowers the cup holder.

18. The system in claim 1, further comprising a touch interface that controls the system.

19. The system in claim 1, further comprising removable liners that are configured to be nested within the cup holder.

20. The system in claim 19, wherein the removably liners are disposable.

* * * * *